(12) United States Patent
Kuang et al.

(10) Patent No.: US 9,282,609 B2
(45) Date of Patent: Mar. 8, 2016

(54) DIMMER COMPATIBLE LED DRIVING APPARATUS WITH ADJUSTABLE BLEEDING CURRENT

(71) Applicant: Chengdu Monolithic Power Systems Co., Ltd., Chengdu (CN)

(72) Inventors: Naixing Kuang, Hangzhou (CN); Jiali Cai, Hangzhou (CN); Lin Feng, Chengdu (CN)

(73) Assignee: Chengdu Monolithic Power Systems Co., Ltd., Chengdu (CN)

( * ) Notice: Subject to any disclaimer, the term of this patent is extended or adjusted under 35 U.S.C. 154(b) by 0 days.

(21) Appl. No.: 14/738,609

(22) Filed: Jun. 12, 2015

(65) Prior Publication Data

US 2015/0366018 A1    Dec. 17, 2015

(30) Foreign Application Priority Data

Jun. 13, 2014    (CN) .......................... 2014 1 0261980

(51) Int. Cl.
*H05B 37/02*    (2006.01)
*H05B 33/08*    (2006.01)

(52) U.S. Cl.
CPC ........ *H05B 33/0845* (2013.01); *H05B 33/0815* (2013.01)

(58) Field of Classification Search
USPC ...................... 315/200 R–210, 307
See application file for complete search history.

(56) References Cited

U.S. PATENT DOCUMENTS

| | | | | |
|---|---|---|---|---|
| 2011/0115400 A1* | 5/2011 | Harrison | ............ | H05B 33/0815 315/287 |
| 2011/0285301 A1 | 11/2011 | Kuang et al. | | |
| 2013/0113391 A1* | 5/2013 | Mercier | ............ | H05B 33/0809 315/291 |
| 2013/0154487 A1 | 6/2013 | Kuang et al. | | |
| 2014/0239849 A1* | 8/2014 | Del Carmen, Jr. | . | H05B 33/0815 315/307 |

* cited by examiner

*Primary Examiner* — Douglas W Owens
*Assistant Examiner* — Jonathan Cooper
(74) *Attorney, Agent, or Firm* — Perkins Coie LLP

(57) ABSTRACT

An LED driving apparatus includes a rectifier bridge generating a DC bus voltage, a bus capacitor coupled between the output terminal of the rectifier bridge and a reference ground, a voltage sensing circuit generating a voltage sensing signal indicative of the DC bus voltage, a bleeding circuit providing a bleeding current for the bus capacitor, a switching converter configured to convert the DC bus voltage into a driving signal to drive an LED, a dimming mode detector detecting whether the LED driving apparatus is coupled to a leading edge dimmer or a trailing edge dimmer based on the voltage sensing signal, and a bleeding control circuit generating a control signal to control the bleeding circuit based on the voltage sensing signal, the leading edge dimming mode signal and the trailing edge dimming mode signal.

16 Claims, 6 Drawing Sheets

DIMMER COMPATIBLE LED DRIVING APPARATUS WITH ADJUSTABLE BLEEDING CURRENT

CROSS-REFERENCE TO RELATED APPLICATION(S)

This application claims the benefit of CN application 201410261980.0 filed on Jun. 13, 2014, and incorporated herein by reference.

TECHNICAL FIELD

The present invention generally relates to electronic circuits, and more particularly but not exclusively to LED driving apparatuses which are compatible with dimmers.

BACKGROUND

Nowadays, there is an increasing interest to replace conventional incandescent bulbs with LEDs (light emitting diodes). Nevertheless, how to make LED driving apparatus be compatible with dimmers in existing lighting apparatuses becomes a challenge.

The most common dimmers are phase cut dimmers including leading edge dimmers and trailing edge dimmers, wherein the main supply is cut off for part of the main cycle. In some situations, the dimmer has been removed so there is no dimmer. To sum up, there are three different dimming conditions: leading edge dimming, trailing edge dimming and no dimming.

A bleeding circuit is often employed to improve dimming performance of the LED driving apparatus. A prior art bleeding circuit including a bleeding resistor Rb and a bleeding transistor Sb is shown in FIG. 1. The bleeding transistor Sb turns on to provide a bleeding current when the bus voltage Vbus is smaller than a predetermined value.

Due to the significantly different working principles, the bleeding current required in trailing edge dimming is much larger than that needed in leading edge dimming. As a result, the bleeding resistor Rb is generally designed to be relatively small to fit both leading edge dimming and trailing edge dimming, which absolutely limits the efficiency of the LED driving apparatus in leading edge dimming. In no dimming situations, the efficiency suffers even more.

SUMMARY

Embodiments of the present invention are directed to a controller used in an LED driving apparatus, wherein the LED driving apparatus includes a rectifier bridge providing a DC bus voltage at an output terminal, a bus capacitor coupled between the output terminal of the rectifier bridge and a reference ground, a bleeding circuit configured to provide a bleeding current for the bus capacitor and a switching converter configured to convert the DC bus voltage into a driving signal to drive an LED, and wherein the controller comprises: a dimming mode detector configured to receive a voltage sensing signal indicative of the DC bus voltage, wherein based on the voltage sensing signal, the dimming mode detector detects whether the LED driving apparatus is coupled to a leading edge dimmer or a trailing edge dimmer, and generates a leading edge dimming mode signal and a trailing edge dimming mode signal; and a bleeding control circuit coupled to the dimming mode detector, wherein based on the voltage sensing signal, the leading edge dimming mode signal and the trailing edge dimming mode signal, the bleeding control circuit generates a control signal to control the bleeding circuit. If the LED driving apparatus is coupled to a leading edge dimmer, the bleeding circuit will provide a first bleeding current when the voltage sensing signal becomes smaller than a first threshold voltage. If the LED driving apparatus is coupled to a trailing edge dimmer, the bleeding circuit will provide a second bleeding current when the voltage sensing signal becomes smaller than a second threshold voltage.

Embodiments of the present invention are also directed to an LED driving apparatus comprising: a rectifier bridge having an output terminal, wherein the rectifier bridge is configured to generate a DC bus voltage at the output terminal; a bus capacitor coupled between the output terminal of the rectifier bridge and a reference ground; a voltage sensing circuit coupled to the output terminal of the rectifier bridge, wherein the voltage sensing circuit generates a voltage sensing signal indicative of the DC bus voltage; a bleeding circuit configured to provide a bleeding current for the bus capacitor; a switching converter coupled to the output terminal of the rectifier bridge, wherein the switching converter is configured to convert the DC bus voltage into a driving signal to drive an LED; a dimming mode detector coupled to the voltage sensing circuit, wherein based on the voltage sensing signal, the dimming mode detector detects whether the LED driving apparatus is coupled to a leading edge dimmer or a trailing edge dimmer, and generates a leading edge dimming mode signal and a trailing edge dimming mode signal; and a bleeding control circuit coupled to the voltage sensing circuit and the dimming mode detector, wherein based on the voltage sensing signal, the leading edge dimming mode signal and the trailing edge dimming mode signal, the bleeding control circuit generates a control signal to control the bleeding circuit. If the LED driving apparatus is coupled to a leading edge dimmer, the bleeding circuit will provide a first bleeding current when the voltage sensing signal becomes smaller than a first threshold voltage. If the LED driving apparatus is coupled to a trailing edge dimmer, the bleeding circuit will provide a second bleeding current when the voltage sensing signal becomes smaller than a second threshold voltage.

Embodiments of the present invention are further directed to a control method used in an LED driving apparatus, wherein the LED driving apparatus includes a rectifier bridge providing a DC bus voltage, a bus capacitor coupled between output terminals of the rectifier bridge, a bleeding circuit configured to provide a bleeding current for the bus capacitor and a switching converter configured to convert the DC bus voltage into a driving signal to drive an LED. The dimming mode detection method comprises: sensing the DC bus voltage and generating a voltage sensing signal; and detecting whether the LED driving apparatus is coupled to a leading edge dimmer or a trailing edge dimmer based on the voltage sensing signal; if the LED driving apparatus is coupled to a leading edge dimmer, providing a first bleeding current when the voltage sensing signal becomes smaller than a first threshold voltage; and if the LED driving apparatus is coupled to a trailing edge dimmer, providing a second bleeding current when the voltage sensing signal becomes smaller than a second threshold voltage.

BRIEF DESCRIPTION OF THE DRAWINGS

The present invention can be further understood with reference to the following detailed description and the appended drawings, wherein like elements are provided with like reference numerals.

DETAILED DESCRIPTION

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be obvious to one of ordinary skill in the art that the present invention may be practiced without these specific details. In other instances, well-known methods, procedures, components, and circuits have not been described in detail so as not to unnecessarily obscure aspects of the present invention.

Figure 1:
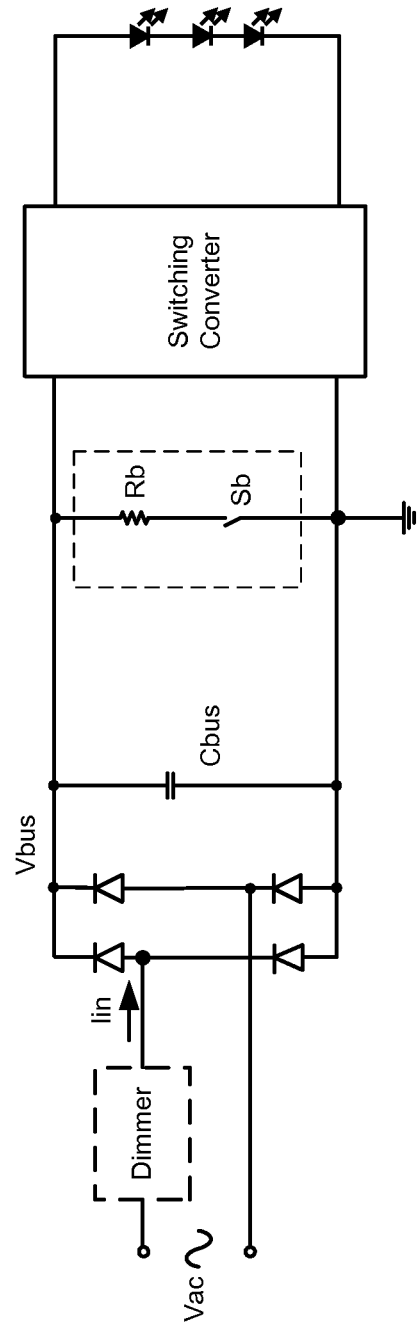
FIG. 1 schematically illustrates a prior art LED driving apparatus with a bleeding circuit.
Figure 2:
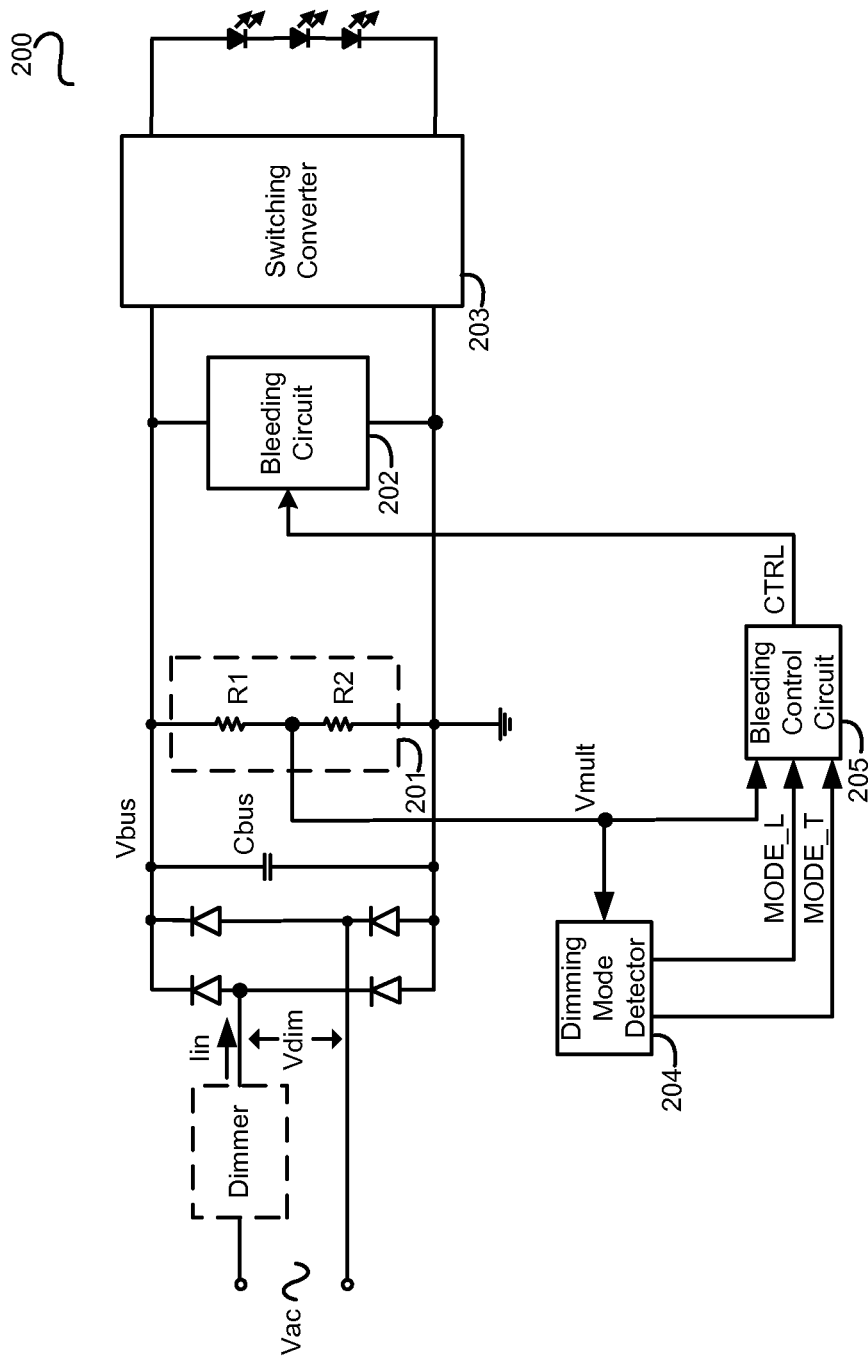
FIG. 2 schematically illustrates a block diagram of an LED driving apparatus 200 in accordance with an embodiment of the present invention.

FIG. 2 schematically illustrates a block diagram of an LED driving apparatus 200 in accordance with an embodiment of the present invention. The LED driving apparatus 200 comprises a rectifier bridge, a bus capacitor Cbus, a voltage sensing circuit 201, a bleeding circuit 202, a switching converter 203, a dimming mode detector 204 and a bleeding control circuit 205. The rectifier bridge is configured to rectify a voltage Vdim and generate a DC bus voltage Vbus at its output terminal. The bus capacitor Vbus is coupled between the output terminal of the rectifier bridge and a reference ground. In some embodiments, the voltage Vdim is output by a phase cut dimmer wherein an AC input voltage Vac is cut off for part of the main cycle. In some other embodiments, the phase cut dimmer is removed and the voltage Vdim is equal to the AC input voltage Vac.

The voltage sensing circuit 201 is coupled to the output terminal of the rectifier bridge. It senses the DC bus voltage Vbus and generates a voltage sensing signal Vmult indicative of the DC bus voltage. In the embodiment shown in FIG. 2, the voltage sensing circuit 201 consists of a resistor divider including resistors R1 and R2. The bleeding circuit 202 is configured to provide a bleeding current for the bus capacitor Cbus, so as to make sure a leading edge dimmer or a trailing edge dimmer can work normally when coupled to the LED driving apparatus. The switching converter 203 is coupled to the output terminal of the rectifier bridge, and is configured to convert the DC bus voltage Vbus into a driving signal to drive LEDs. Although there are only three LEDs shown in FIG. 2, people of ordinary skill in the art can understand that the LED driving apparatus 200 may be used to drive an LED string constituted of one or more LEDs, or a plurality of LED strings connected in parallel.

The dimming mode detector 204 is coupled to the voltage sensing circuit 201 to receive the voltage sensing signal Vmult. Based on the voltage sensing signal Vmult, the dimming mode detector 204 detects whether the LED driving apparatus is coupled to a leading edge dimmer or a trailing edge dimmer, and generates a leading edge dimming mode signal MODE_L and a trailing edge dimming mode signal MODE_T to indicate operation modes of the LED driving apparatus. The dimming mode detector 204 may detect the type of the dimmer based on the slew rate or virtual value of the voltage sensing signal Vmult.

The bleeding control circuit 205 is coupled to the voltage sensing circuit 201 and the dimming mode detector 204. It generates a control signal CTRL to control the bleeding circuit 202 based on the voltage sensing signal Vmult, the leading edge dimming mode signal MODE_L and the trailing edge dimming mode signal MODE_T.

Figure 3:
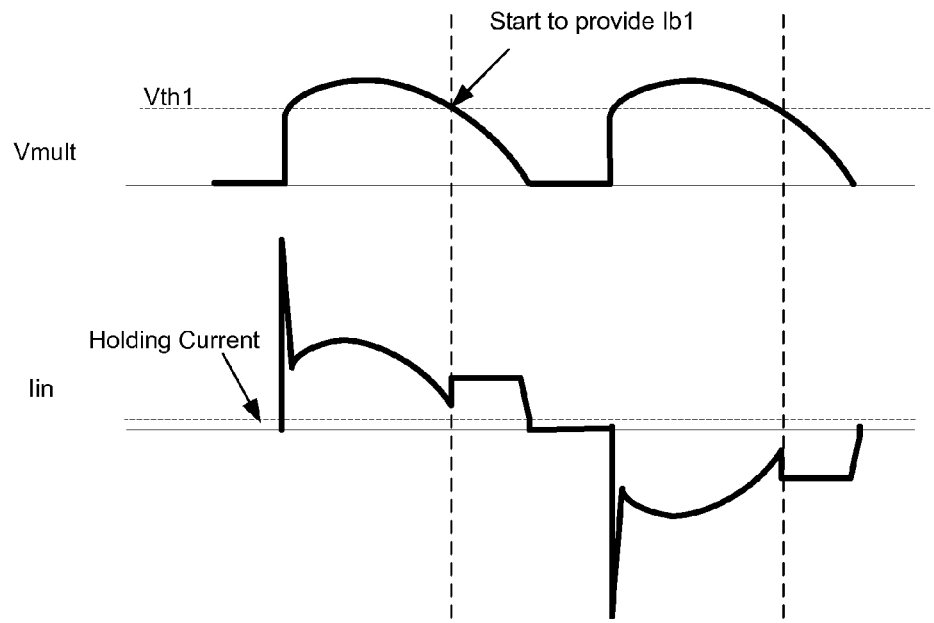
FIG. 3 schematically illustrates working waveforms of the LED driving apparatus 200 when it is coupled to a leading edge dimmer.

As can be seen from FIG. 3, when the LED driving apparatus 200 is coupled to a leading edge dimmer, the bleeding circuit 202 provides a first bleeding current Ib1 when the voltage sensing signal Vmult becomes smaller than a first threshold voltage Vth1. Therefore, the input current Iin of the LED driving apparatus 200 is larger than the holding current of the leading edge dimmer, which induces the dimmer to keep on until the AC input voltage Vac crosses zero. By doing so, the potential dimmer muti-fire is eliminated. In some embodiments, the bleeding circuit 202 starts providing the first bleeding current Ib1 when the voltage sensing signal Vmult becomes smaller than a first threshold voltage Vth1, and stops when the voltage sensing signal Vmult reduces to zero or slightly higher than zero. But in some other embodiments, the bleeding circuit 202 stops providing the bleeding current only after the voltage sensing signal Vmult becomes larger than the first threshold voltage Vth1.

Figure 4:
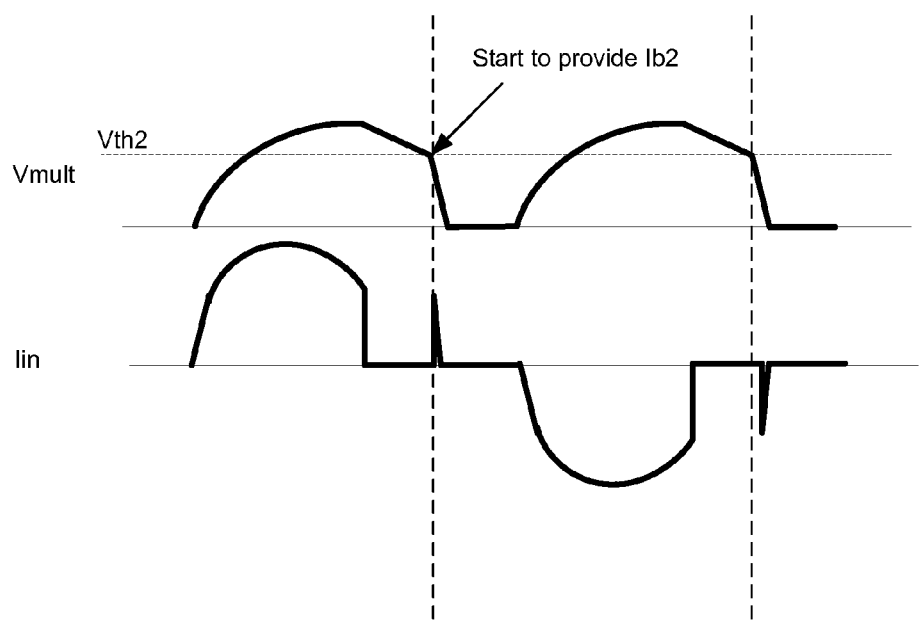
FIG. 4 schematically illustrates working waveforms of the LED driving apparatus 200 when it is coupled to a trailing edge dimmer.

As further can be seen from FIG. 4, when the LED driving apparatus 200 is coupled to a trailing edge dimmer, the bleeding circuit 202 provides a second bleeding current Ib2 to discharge the bus capacitor Cbus when the voltage sensing signal Vmult becomes smaller than a second threshold voltage Vth2. The DC bus voltage Vbus rapidly reduces to zero and the potential flicker has been avoided. In some embodiments, the bleeding circuit 202 starts providing the second bleeding current Ib2 when the voltage sensing signal Vmult becomes smaller than the second threshold voltage Vth2, and stops when the voltage sensing signal Vmult reduces to zero or slightly higher than zero. But in some other embodiments, the bleeding circuit 202 stops providing the bleeding current only after the voltage sensing signal Vmult becomes larger than the second threshold voltage Vth2.

The bleeding current Ib1 is typically smaller than Ib2. Both of them can be either constant or variable. Through detecting whether the LED driving apparatus is coupled to a leading edge dimmer or a trailing edge dimming and providing different bleeding current in different dimming conditions, the working efficiency of the LED driving apparatus is optimized.

In some embodiments, to reduce power loss, the bleeding circuit 202 stops providing any bleeding current when the LED driving apparatus 200 is not coupled to any dimmer. So in no dimming condition, the bleeding current is genuinely zero.

In the embodiment of FIG. 2, the bleeding circuit 202 is coupled to the bus capacitor Cbus in parallel. Nevertheless, the bleeding circuit 202 may be located in other suitable place without departing from the spirit and the scope of the invention.

Figure 5:
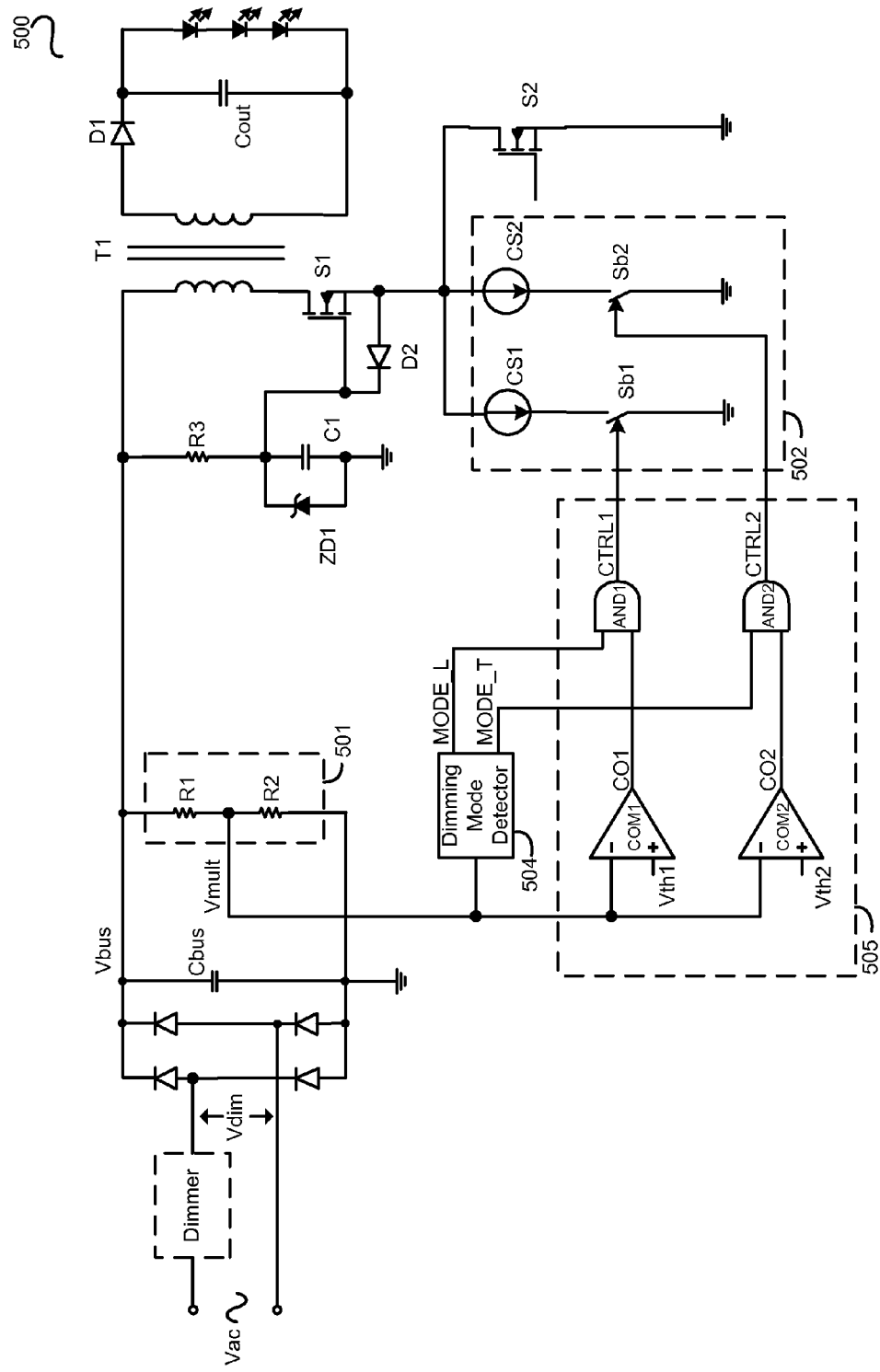
FIG. 5 schematically illustrates a block diagram of an LED driving apparatus 500 in accordance with an embodiment of the present invention.

FIG. 5 schematically illustrates a block diagram of an LED driving apparatus 500 in accordance with an embodiment of the present invention. The switching converter in the LED driving apparatus 500 is configured in a flyback topology including a transformer T1, transistors S1, S2, a diode D1 and an output capacitor Cout. The transformer T1 has a primary winding and a secondary winding, wherein the primary winding and secondary winding both have a first terminal and a second terminal. The first terminal of the primary winding is coupled to the output terminal of the rectifier bridge to receive the DC bus voltage Vbus. The first transistor S1 has a first terminal, a second terminal and a control terminal, wherein the first terminal is coupled to the second terminal of the primary winding. The second transistor S2 has a first terminal, a second terminal and a control terminal, wherein the first terminal is coupled to the second terminal of the first transistor S1, the second terminal is coupled to the reference ground.

The diode D1 has an anode and a cathode, wherein the anode is coupled to a first terminal of the secondary winding. The output capacitor Cout is coupled between the cathode of the diode D1 and the second terminal of the secondary winding. Although the diode D1 is used for free-wheeling in the embodiment of FIG. 5, people of ordinary skill in the art can recognize that the diode D1 may also be replaced by other suitable free-wheeling switches, such as MOSFET.

The bleeding control circuit 505 comprises comparators COM1, COM2 and AND gates AND1, AND2. The first comparator COM1 has a first input terminal, a second input terminal and an output terminal, wherein the first input terminal is coupled to the voltage sensing circuit 501, the second input terminal is configured to receive the first threshold voltage Vth1. The first comparator COM1 compares the voltage sensing signal Vmult with the first threshold voltage Vth1 and generates a first comparison signal CO1 at the output terminal. The second comparator COM2 has a first input terminal, a second input terminal and an output terminal, wherein the first input terminal is coupled to the voltage sensing circuit 501, the second input terminal is configured to receive the second threshold voltage Vth2, and wherein the second comparator COM2 compares the voltage sensing signal Vmult with the second threshold voltage Vth2 and generates a second comparison signal CO2 at the output terminal. The first AND gate AND1 has a first input terminal, a second input terminal and an output terminal, wherein the first input terminal is coupled to the dimming mode detector 504 to receive the leading edge dimming mode signal MODE_L, the second input terminal is coupled to the output terminal of the first comparator COM1 to receive the first comparison signal CO1, the output terminal is configured to provide a first control signal CTRL1. The second AND gate AND2 has a first input terminal, a second input terminal and an output terminal, wherein the first input terminal is coupled to the dimming mode detector 504 to receive the trailing edge dimming mode signal MODE_T, the second input terminal is coupled to the output terminal of the second comparator COM2 to receive the second comparison signal CO2, the output terminal is configured to provide a second control signal CTRL2.

The bleeding circuit 502 comprises bleeding current source CS1, CS2 and bleeding transistors Sb1, Sb2. The first bleeding current source CS1 has a first terminal and a second terminal, wherein the first terminal is coupled to the second terminal of the first transistor S1 and the first terminal of the second transistor S2. The first bleeding transistor Sb1 has a first terminal, a second terminal and an output terminal, wherein the first terminal is coupled to the second terminal of the first bleeding current source CS1, the second terminal is coupled to the reference ground, and the control terminal is coupled to the bleeding control circuit 505 to receive the first control signal CTRL1. The second bleeding current source CS2 has a first terminal and a second terminal, wherein the first terminal is coupled to the second terminal of the first transistor S1 and the first terminal of the second transistor S2. The second bleeding transistor Sb2 has a first terminal, a second terminal and an output terminal, wherein the first terminal is coupled to the second terminal of the second bleeding current source CS2, the second terminal is coupled to the reference ground, and the control terminal is coupled to the bleeding control circuit 505 to receive a second control signal CTRL2.

When the LED driving apparatus 500 is coupled to a leading edge dimmer, the leading edge dimming mode signal MODE_L is logical high and the trailing edge dimming ode signal is logical low. The first bleeding transistor Sb1 turns on when the voltage sensing signal Vmult becomes smaller than the first threshold voltage Vth1, and the first bleeding current source CS1 provides the first bleeding current Ib1. When the LED driving apparatus 500 is coupled to a trailing edge dimmer, the leading edge dimming mode signal MODE_L is logical low and the trailing edge dimming ode signal is logical high. The second bleeding transistor Sb2 turns on when the voltage sensing signal Vmult becomes smaller than the second threshold voltage Vth2, and the second bleeding current source CS2 provides the second bleeding current Ib2. When the LED driving apparatus 500 is neither coupled to a leading edge dimmer nor a trailing edge dimmer, the leading edge dimming mode signal MODE_L and the trailing edge dimming mode signal are both logical low. The bleeding transistors Sb1 and Sb2 both turn off and the bleeding circuit 502 stops providing any bleeding current.

In some embodiments, the switching converter shown in FIG. 5 further comprises a resistor R3, a capacitor C1, a zener diode ZD1 and a diode D2, connected as shown in the figure.

The bleeding transistors Sb1, Sb2 and the second transistor S2 are coupled between the first transistor S1 and the reference ground, thus do not need to sustain high voltage. This allows IC manufacturers to fabricate the bleeding circuit 502, dimming mode detector 504, bleeding control circuit 505 and the second transistor S2 on a single chip.

Figure 6:
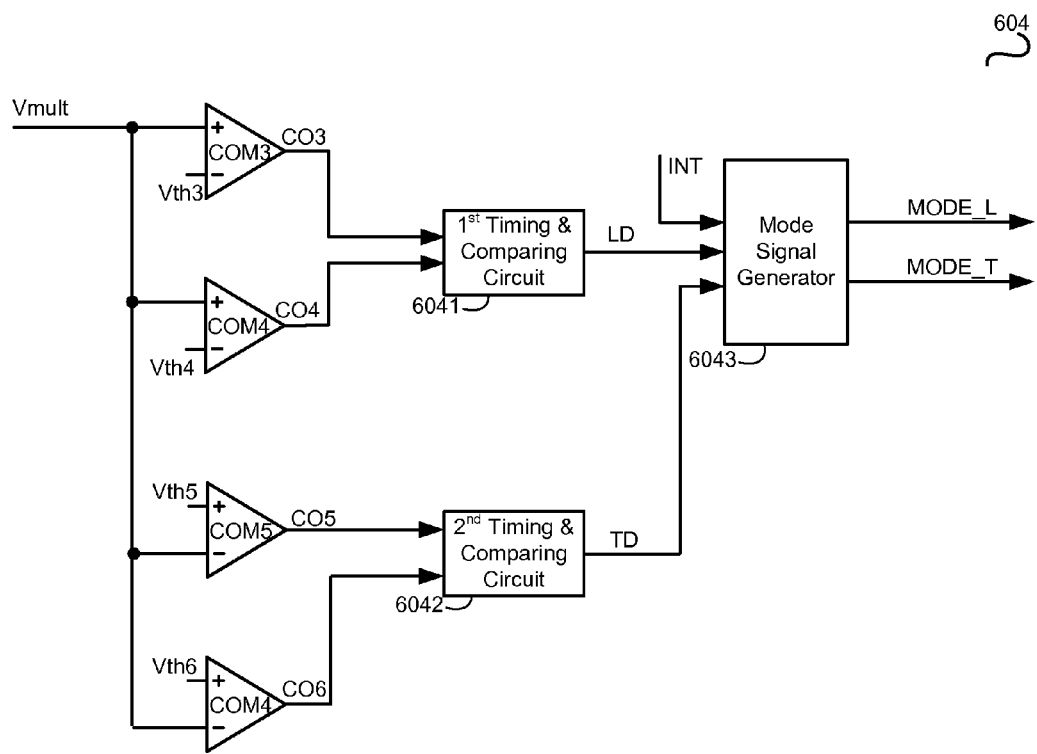
FIG. 6 schematically illustrates a dimming mode detector 604 in accordance with an embodiment of the present invention.

FIG. 6 schematically illustrates a dimming mode detector 604 in accordance with an embodiment of the present invention. The dimming mode detector 604 compares a rising time tr during which the voltage sensing signal Vmult increases from a fourth threshold voltage Vth4 to a third threshold voltage Vth3 with a first time threshold TTH1 to detect whether the LED driving apparatus is coupled to a leading edge dimmer. It further compares a falling time tf during which the voltage sensing signal Vmult decreases from a fifth threshold voltage Vth5 to a sixth threshold voltage Vth6 with a second time threshold TTH2 to detect whether the LED driving apparatus is coupled to a trailing edge dimmer. If the LED driving apparatus is not detected to be coupled to either a leading edge dimmer or a trailing edge dimmer in a predetermined time from the LED driving apparatus being powered on, the dimming mode detector 604 will conclude that the LED driving apparatus is not coupled to any dimmer.

The dimming mode detector 604 comprises comparators COM3-COME, a first timing and comparing circuit 6041, a second timing and comparing circuit 6042 and a mode signal generator 6043. The third comparator COM3 has a first input terminal, a second input terminal and an output terminal, wherein the first input terminal is coupled to the voltage sensing circuit to receive the voltage sensing signal Vmult, the second input terminal is configured to receive the third threshold voltage Vth3, and wherein the third comparator COM3 compares the voltage sensing signal Vmult with the third threshold voltage Vth3 and generates a third comparison signal CO3 at the output terminal. The fourth comparator COM4 has a first input terminal, a second input terminal and an output terminal, wherein the first input terminal is coupled to the voltage sensing circuit to receive the voltage sensing signal Vmult, the second input terminal is configured to receive the fourth threshold voltage Vth4, and wherein the fourth comparator COM4 compares the voltage sensing signal Vmult with the fourth threshold voltage Vth4 and generates a fourth comparison signal CO4 at the output terminal.

The first timing and comparing circuit 6041 has a first input terminal, a second input terminal and an output terminal, wherein the first input terminal is coupled to the output terminal of the third comparator COM3, the second input terminal is coupled to the output terminal of the fourth comparator COM4, and wherein based on the third and fourth comparison signals CO3 and CO4, the first timing and comparing circuit 6041 calculates the rising time tr of the voltage sensing signal Vmult, compares the rising time tr with the first time threshold TTH1 and generates a leading edge detection signal LD at the output terminal.

The fifth comparator COM5 has a first input terminal, a second input terminal and an output terminal, wherein the first input terminal is configured to receive the fifth threshold voltage Vth5, the second input terminal is coupled to the voltage sensing circuit to receive the voltage sensing signal Vmult, and wherein the fifth comparator COM5 compares the voltage sensing signal Vmult with the fifth threshold voltage Vth5 and generates a fifth comparison signal CO5 at the output terminal. The sixth comparator COM6 has a first input terminal, a second input terminal and an output terminal, wherein the first input terminal is configured to receive the sixth threshold voltage Vth6, the second input terminal is coupled to the voltage sensing circuit to receive the voltage sensing signal Vmult, and wherein the sixth comparator COM6 compares the voltage sensing signal Vmult with the sixth threshold voltage Vth6 and generates a sixth comparison signal CO6 at the output terminal.

The second timing and comparing circuit 6042 has a first input terminal, a second input terminal and an output terminal, wherein the first input terminal is coupled to the output terminal of the fifth comparator COM5, the second input terminal is coupled to the output terminal of the sixth comparator COM6, and wherein based on the fifth and sixth comparison signals CO5 and CO6, the second timing and comparing circuit 6042 calculates the falling time if of the voltage sensing signal Vmult, compares the falling time tf with the second time threshold TTH2 and generates a trailing edge detection signal TD at the output terminal.

The mode signal generator 6043 has a first input terminal, a second input terminal, a third input terminal, a first output terminal and a second output terminal, wherein the first input terminal is configured to receive a power on signal INT indicative of the power on the LED driving apparatus, the second input terminal is coupled to the output terminal of the first timing and comparing circuit 6041, the third input terminal is coupled to the output terminal of the second timing and comparing circuit 6042, and wherein based on the power on signal INT, leading edge detection signal LD and trailing edge detection signal TD, the mode signal generator 6043 generates the leading edge dimming mode signal MODE_L and trailing edge dimming mode signal MODE_T respectively at the two output terminals.

Figure 7:
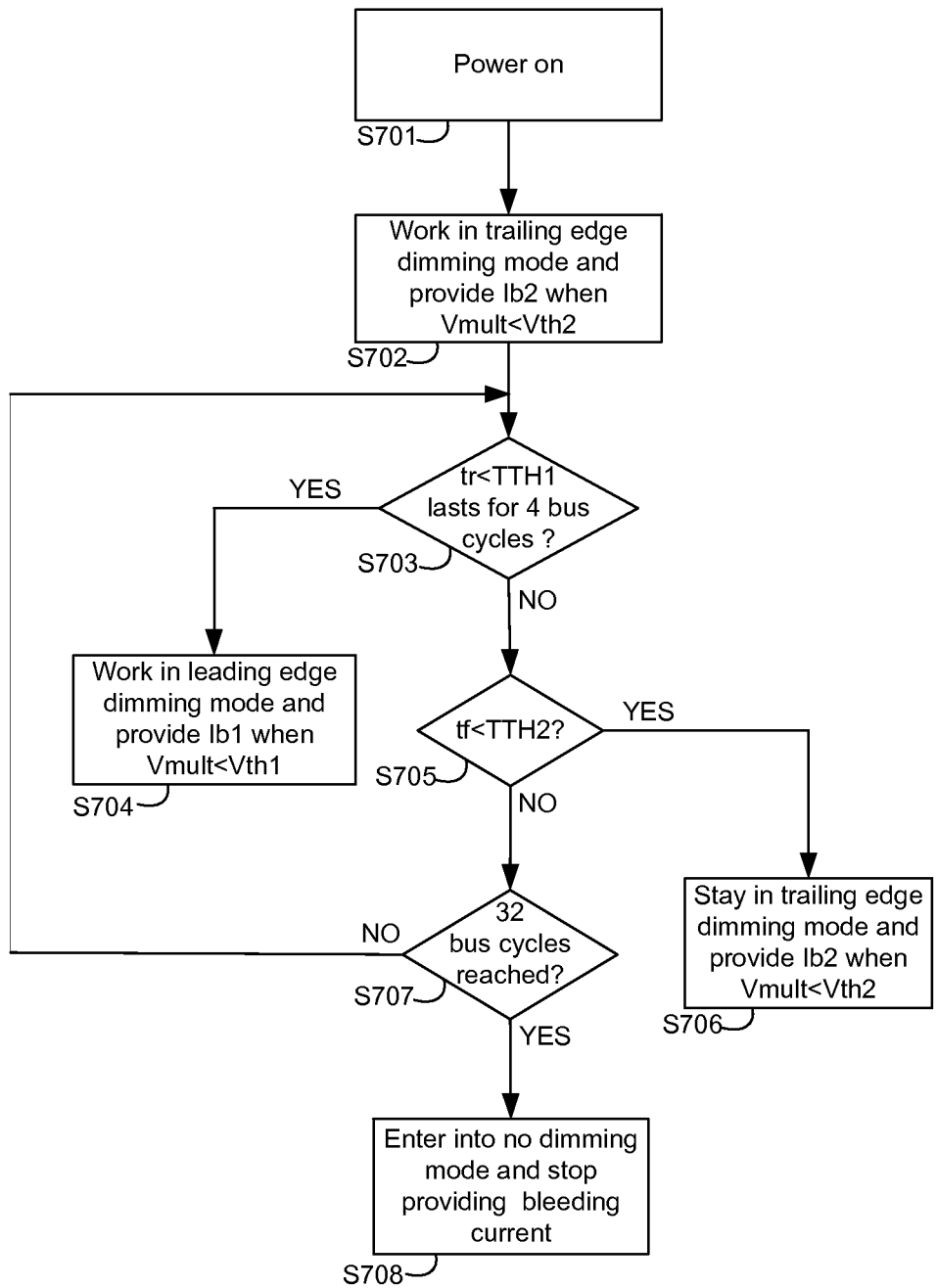
FIG. 7 illustrates a working flow chart of an LED driving apparatus in accordance with an embodiment of the present invention.

FIG. 7 illustrates a working flow chart of an LED driving apparatus in accordance with an embodiment of the present invention. It includes steps S701-S708.

At step S701, the LED driving apparatus is powered on.

At step S702, the LED driving apparatus enters into the trailing edge dimming mode and the second bleeding current Ib2 is provided when the voltage sensing signal Vmult becomes smaller than the second threshold voltage Vth2.

At step 703, the rising time tr of the voltage sensing signal Vmult is compared with the first time threshold TTH1 to detect whether the LED driving apparatus is coupled to a leading edge dimmer. If the LED driving apparatus is detected to be coupled to a leading edge dimmer, the process will proceed to step S704, else it will proceed to step S705. In one embodiment, the LED driving apparatus will be deemed as being coupled to a leading edge dimmer if the rising time tr is shorter than the first time threshold TTH1. In another embodiment, the LED driving apparatus will be deemed as being coupled to a leading edge dimmer only if the rising time is shorter than the first time threshold in a plurality of successive bus cycles (e.g. four successive bus cycles). The bus cycle here is directed to the cycle of the DC bus voltage Vbus.

At step S704, the LED driving apparatus enters into the leading edge dimming mode and the first bleeding current Ib1 is provided when the voltage sensing signal Vmult becomes smaller than the first threshold voltage Vth1.

At step S705, the falling time tf of the voltage sensing signal Vmult is compared with the second time threshold TTH2 to detect whether the LED driving apparatus is coupled to a trailing edge dimmer. If the LED driving apparatus is detected to be coupled to a trailing edge dimmer, the process will proceed to step S706, else it will proceed to step S707. In one embodiment, the LED driving apparatus will be deemed as being coupled to a trailing edge dimmer if the falling time tr is shorter than the second time threshold TTH2.

At step S706, the LED driving apparatus maintains in the trailing edge dimming mode and the second bleeding current Ib2 is still provided when the voltage sensing signal Vmult becomes smaller than the second threshold voltage Vth2.

At step S707, detect whether a predetermined time (for example, 32 bus cycles) from the LED driving apparatus being powered on is reached. If yes, the process goes to step S708, else, the process goes back to step S703.

At step S708, the LED driving apparatus enters into the no dimming mode and stop providing any bleeding current.

Obviously many modifications and variations of the present invention are possible in light of the above teachings. It is therefore to be understood that within the scope of the appended claims the invention may be practiced otherwise than as specifically described. It should be understood, of course, the foregoing disclosure relates only to a preferred embodiment (or embodiments) of the invention and that numerous modifications may be made therein without departing from the spirit and the scope of the invention as set forth in the appended claims. Various modifications are contemplated and they obviously will be resorted to by those skilled in the art without departing from the spirit and the scope of the invention as hereinafter defined by the appended claims as only a preferred embodiment(s) thereof has been disclosed.

We claim:

1. A controller used in an LED driving apparatus, wherein the LED driving apparatus includes a rectifier bridge providing a DC bus voltage at an output terminal, a bus capacitor coupled between the output terminal of the rectifier bridge and a reference ground, a bleeding circuit configured to provide a bleeding current for the bus capacitor and a switching converter configured to convert the DC bus voltage into a driving signal to drive an LED, and wherein the controller comprises:

a dimming mode detector configured to receive a voltage sensing signal indicative of the DC bus voltage, wherein based on the voltage sensing signal, the dimming mode detector detects whether the LED driving apparatus is coupled to a leading edge dimmer or a trailing edge dimmer, and generates a leading edge dimming mode signal and a trailing edge dimming mode signal; and a bleeding control circuit coupled to the dimming mode detector, wherein based on the voltage sensing signal, the leading edge dimming mode signal and the trailing edge dimming mode signal, the bleeding control circuit generates a control signal to control the bleeding circuit; wherein if the LED driving apparatus is coupled to a leading edge dimmer, the bleeding circuit will provide a first bleeding current when the voltage sensing signal becomes smaller than a first threshold voltage;

if the LED driving apparatus is coupled to a trailing edge dimmer, the bleeding circuit will provide a second bleeding current when the voltage sensing signal becomes smaller than a second threshold voltage.

2. The controller of claim 1, wherein the dimming mode detector compares a rising time during which the voltage sensing signal increases from a fourth threshold voltage to a third threshold voltage with a first time threshold to detect whether the LED driving apparatus is coupled to a leading edge dimmer, and wherein the dimming mode detector compares a falling time during which the voltage sensing signal decreases from a fifth threshold voltage to a sixth threshold voltage with a second time threshold to detect whether the LED driving apparatus is coupled to a trailing edge dimmer.

3. The controller of claim 1, wherein if the LED driving apparatus is not detected to be coupled to either a leading edge dimmer or a trailing edge dimmer in a predetermined time from the LED driving apparatus being powered on, the LED driving apparatus will be deemed as not being coupled to any dimmer and the bleeding circuit will stop providing the bleeding current.

4. The controller of claim 1, wherein the bleeding control circuit comprises:

a first comparator having a first input terminal, a second input terminal and an output terminal, wherein the first input terminal is configured to receive the voltage sensing signal, the second input terminal is configured to receive the first threshold voltage, and wherein the first comparator compares the voltage sensing signal with the first threshold voltage and generates a first comparison signal at the output terminal;

a second comparator having a first input terminal, a second input terminal and an output terminal, wherein the first input terminal is configured to receive the voltage sensing signal, the second input terminal is configured to receive the second threshold voltage, and wherein the second comparator compares the voltage sensing signal with the second threshold voltage and generates a second comparison signal at the output terminal;

a first AND gate having a first input terminal, a second input terminal and an output terminal, wherein the first input terminal is coupled to the dimming mode detector to receive the leading edge dimming mode signal, the second input terminal is coupled to the output terminal of the first comparator to receive the first comparison signal, the output terminal is configured to provide a first control signal; and a second AND gate having a first input terminal, a second input terminal and an output terminal, wherein the first input terminal is coupled to the dimming mode detector to receive the trailing edge dimming mode signal, the second input terminal is coupled to the output terminal of the second comparator to receive the second comparison signal, the output terminal is configured to provide a second control signal.

5. The controller of claim 1, wherein the dimming mode detector comprises:

a third comparator having a first input terminal, a second input terminal and an output terminal, wherein the first input terminal is configured to receive the voltage sensing signal, the second input terminal is configured to receive a third threshold voltage, and wherein the third comparator compares the voltage sensing signal with the third threshold voltage and generates a third comparison signal at the output terminal;

a fourth comparator having a first input terminal, a second input terminal and an output terminal, wherein the first input terminal is configured to receive the voltage sensing signal, the second input terminal is configured to receive a fourth threshold voltage, and wherein the fourth comparator compares the voltage sensing signal with the fourth threshold voltage and generates a fourth comparison signal at the output terminal;

a first timing and comparing circuit having a first input terminal, a second input terminal and an output terminal, wherein the first input terminal is coupled to the output terminal of the third comparator, the second input terminal is coupled to the output terminal of the fourth comparator, and wherein based on the third and fourth comparison signals, the first timing and comparing circuit calculates a rising time of the voltage sensing signal, compares the rising time with a first time threshold and generates a leading edge detection signal at the output terminal;

a fifth comparator having a first input terminal, a second input terminal and an output terminal, wherein the first input terminal is configured to receive a fifth threshold voltage, the second input terminal is configured to receive the voltage sensing signal, and wherein the fifth comparator compares the voltage sensing signal with the fifth threshold voltage and generates a fifth comparison signal at the output terminal;

a sixth comparator having a first input terminal, a second input terminal and an output terminal, wherein the first input terminal is configured to receive a sixth threshold voltage, the second input terminal is configured to receive the voltage sensing signal, and wherein the sixth comparator compares the voltage sensing signal with the sixth threshold voltage and generates a sixth comparison signal at the output terminal;

a second timing and comparing circuit having a first input terminal, a second input terminal and an output terminal, wherein the first input terminal is coupled to the output terminal of the fifth comparator, the second input terminal is coupled to the output terminal of the sixth comparator, and wherein based on the fifth and sixth comparison signals, the second timing and comparing circuit calculates a falling time of the voltage sensing signal, compares the falling time with a second time threshold and generates a trailing edge detection signal at the output terminal; and a mode signal generator having a first input terminal, a second input terminal, a third input terminal, a first output terminal and a second output terminal, wherein the first input terminal is configured to receive a power on signal, the second input terminal is coupled to the output terminal of the first timing and comparing circuit, the third input terminal is coupled to the output terminal of the second timing and comparing circuit, and wherein based on the power on signal, leading edge detection signal and trailing edge detection signal, the mode signal generator generates the trailing edge dimming mode signal and leading edge dimming mode signal respectively at the first and second output terminals.

6. An LED driving apparatus comprising:
a rectifier bridge having an output terminal, wherein the rectifier bridge is configured to generate a DC bus voltage at the output terminal;
a bus capacitor coupled between the output terminal of the rectifier bridge and a reference ground;
a voltage sensing circuit coupled to the output terminal of the rectifier bridge, wherein the voltage sensing circuit generates a voltage sensing signal indicative of the DC bus voltage;
a bleeding circuit configured to provide a bleeding current for the bus capacitor;
a switching converter coupled to the output terminal of the rectifier bridge, wherein the switching converter is configured to convert the DC bus voltage into a driving signal to drive an LED;
a dimming mode detector coupled to the voltage sensing circuit, wherein based on the voltage sensing signal, the dimming mode detector detects whether the LED driving apparatus is coupled to a leading edge dimmer or a trailing edge dimmer, and generates a leading edge dimming mode signal and a trailing edge dimming mode signal; and
a bleeding control circuit coupled to the voltage sensing circuit and the dimming mode detector, wherein based on the voltage sensing signal, the leading edge dimming mode signal and the trailing edge dimming mode signal, the bleeding control circuit generates a control signal to control the bleeding circuit; wherein
if the LED driving apparatus is coupled to a leading edge dimmer, the bleeding circuit will provide a first bleeding current when the voltage sensing signal becomes smaller than a first threshold voltage;
if the LED driving apparatus is coupled to a trailing edge dimmer, the bleeding circuit will provide a second bleeding current when the voltage sensing signal becomes smaller than a second threshold voltage.

7. The LED driving apparatus of claim 6, wherein the dimming mode detector compares a rising time during which the voltage sensing signal increases from a fourth threshold voltage to a third threshold voltage with a first time threshold to detect whether the LED driving apparatus is coupled to a leading edge dimmer, and compares a falling time during which the voltage sensing signal decreases from a fifth threshold voltage to a sixth threshold voltage with a second time threshold to detect whether the LED driving apparatus is coupled to a trailing edge dimmer.

8. The LED driving apparatus of claim 6, wherein if the LED driving apparatus is not detected to be coupled to either a leading edge dimmer or a trailing edge dimmer in a predetermined time from the LED driving apparatus being powered on, the LED driving apparatus will be deemed as not being coupled to any dimmer and the bleeding circuit will stop providing the bleeding current.

9. The LED driving apparatus of claim 6, wherein the bleeding control circuit comprises:
a first comparator having a first input terminal, a second input terminal and an output terminal, wherein the first input terminal is coupled to the voltage sensing circuit, the second input terminal is configured to receive the first threshold voltage, and wherein the first comparator compares the voltage sensing signal with the first threshold voltage and generates a first comparison signal at the output terminal;
a second comparator having a first input terminal, a second input terminal and an output terminal, wherein the first input terminal is coupled to the voltage sensing circuit, the second input terminal is configured to receive the second threshold voltage, and wherein the second comparator compares the voltage sensing signal with the second threshold voltage and generates a second comparison signal at the output terminal;
a first AND gate having a first input terminal, a second input terminal and an output terminal, wherein the first input terminal is coupled to the dimming mode detector to receive the leading edge dimming mode signal, the second input terminal is coupled to the output terminal of the first comparator to receive the first comparison signal, the output terminal is configured to provide a first control signal; and
a second AND gate having a first input terminal, a second input terminal and an output terminal, wherein the first input terminal is coupled to the dimming mode detector to receive the trailing edge dimming mode signal, the second input terminal is coupled to the output terminal of the second comparator to receive the second comparison signal, the output terminal is configured to provide a second control signal.

10. The LED driving apparatus of claim 6, wherein the dimming mode detector comprises:
a third comparator having a first input terminal, a second input terminal and an output terminal, wherein the first input terminal is coupled to the voltage sensing circuit, the second input terminal is configured to receive a third threshold voltage, and wherein the third comparator compares the voltage sensing signal with the third threshold voltage and generates a third comparison signal at the output terminal;
a fourth comparator having a first input terminal, a second input terminal and an output terminal, wherein the first input terminal is coupled to the voltage sensing circuit, the second input terminal is configured to receive a fourth threshold voltage, and wherein the fourth comparator compares the voltage sensing signal with the fourth threshold voltage and generates a fourth comparison signal at the output terminal;
a first timing and comparing circuit having a first input terminal, a second input terminal and an output terminal, wherein the first input terminal is coupled to the output terminal of the third comparator, the second input terminal is coupled to the output terminal of the fourth comparator, and wherein based on the third and fourth comparison signals, the first timing and comparing circuit calculates a rising time of the voltage sensing signal, compares the rising time with a first time threshold and generates a leading edge detection signal at the output terminal;
a fifth comparator having a first input terminal, a second input terminal and an output terminal, wherein the first input terminal is configured to receive a fifth threshold voltage, the second input terminal is coupled to the voltage sensing circuit, and wherein the fifth comparator compares the voltage sensing signal with the fifth threshold voltage and generates a fifth comparison signal at the output terminal;

a sixth comparator having a first input terminal, a second input terminal and an output terminal, wherein the first input terminal is configured to receive a sixth threshold voltage, the second input terminal is coupled to the voltage sensing circuit, and wherein the sixth comparator compares the voltage sensing signal with the sixth threshold voltage and generates a sixth comparison signal at the output terminal;

a second timing and comparing circuit having a first input terminal, a second input terminal and an output terminal, wherein the first input terminal is coupled to the output terminal of the fifth comparator, the second input terminal is coupled to the output terminal of the sixth comparator, and wherein based on the fifth and sixth comparison signals, the second timing and comparing circuit calculates a falling time of the voltage sensing signal, compares the falling time with a second time threshold and generates a trailing edge detection signal at the output terminal; and a mode signal generator having a first input terminal, a second input terminal, a third input terminal, a first output terminal and a second output terminal, wherein the first input terminal is configured to receive a power on signal, the second input terminal is coupled to the output terminal of the first timing and comparing circuit, the third input terminal is coupled to the output terminal of the second timing and comparing circuit, and wherein based on the power on signal, leading edge detection signal and trailing edge detection signal, the mode signal generator generates the trailing edge dimming mode signal and leading edge dimming mode signal respectively at the first and second output terminals.

11. The LED driving apparatus of claim 6, wherein the switching converter comprises:

a transformer having a primary winding and a secondary winding, wherein the primary winding and secondary winding both have a first terminal and a second terminal, and the first terminal of the primary winding is coupled to the output terminal of the rectifier bridge to receive the DC bus voltage;

a first transistor having a first terminal, a second terminal and a control terminal, wherein the first terminal is coupled to the second terminal of the primary winding;

a second transistor having a first terminal, a second terminal and a control terminal, wherein the first terminal is coupled to the second terminal of the first transistor, the second terminal is coupled to the reference ground;

a free-wheeling switch having a first terminal and a second terminal, wherein the first terminal is coupled to the first terminal of the secondary winding; and an output capacitor coupled between the second terminal of the free-wheeling switch and the second terminal of the secondary winding.

12. The LED driving apparatus of claim 11, wherein the bleeding circuit comprises:

a first bleeding current source having a first terminal and a second terminal, wherein the first terminal is coupled to the second terminal of the first transistor and the first terminal of the second transistor;

a first bleeding transistor having a first terminal, a second terminal and an output terminal, wherein the first terminal is coupled to the second terminal of the first bleeding current source, the second terminal is coupled to the reference ground, and the control terminal is coupled to the bleeding control circuit to receive a first control signal;

a second bleeding current source having a first terminal and a second terminal, wherein the first terminal is coupled to the second terminal of the first transistor and the first terminal of the second transistor; and a second bleeding transistor having a first terminal, a second terminal and an output terminal, wherein the first terminal is coupled to the second terminal of the second bleeding current source, the second terminal is coupled to the reference ground, and the control terminal is coupled to the bleeding control circuit to receive a second control signal.

13. The LED driving apparatus of claim 11, wherein switching converter further comprises:

a resistor having a first terminal and a second terminal, wherein the first terminal is coupled to the output terminal of the rectifier bridge and the first terminal of the primary winding;

a capacitor having a first terminal and a second terminal, wherein the first terminal is coupled to the second terminal of the resistor and the control terminal of the first transistor, the second terminal is coupled to the reference ground;

a zener diode having an anode and a cathode, wherein the cathode is coupled to the first terminal of the capacitor, the anode is coupled to the reference ground; and a diode having an anode and a cathode, wherein the anode is coupled to the second terminal of the first transistor, the cathode is coupled to the control terminal of the first transistor.

14. A control method used in an LED driving apparatus, wherein the LED driving apparatus includes a rectifier bridge providing a DC bus voltage, a bus capacitor coupled between output terminals of the rectifier bridge, a bleeding circuit configured to provide a bleeding current for the bus capacitor and a switching converter configured to convert the DC bus voltage into a driving signal to drive an LED, and wherein the dimming mode detection method comprises:

sensing the DC bus voltage and generating a voltage sensing signal; and detecting whether the LED driving apparatus is coupled to a leading edge dimmer or a trailing edge dimmer based on the voltage sensing signal;

if the LED driving apparatus is coupled to a leading edge dimmer, providing a first bleeding current when the voltage sensing signal becomes smaller than a first threshold voltage; and if the LED driving apparatus is coupled to a trailing edge dimmer, providing a second bleeding current when the voltage sensing signal becomes smaller than a second threshold voltage.

15. The control method of claim 14, wherein the step of detecting whether the LED driving apparatus is coupled to a leading edge dimmer or a trailing edge dimmer comprises:

comparing a rising time during which the voltage sensing signal increases from a fourth threshold voltage to a third threshold voltage with a first time threshold to detect whether the LED driving apparatus is coupled to a leading edge dimmer; and comparing a falling time during which the voltage sensing signal decreases from a fifth threshold voltage to a sixth threshold voltage with a second time threshold to detect whether the LED driving apparatus is coupled to a trailing edge dimmer.

16. The control method of claim 14, further comprising:
if the LED driving apparatus is not detected to be coupled to either a leading edge dimmer or a trailing edge dimmer in a predetermined time, determining the LED driving apparatus is not coupled to any dimmer and stop providing the bleeding current.

\* \* \* \* \*